US010134240B1

(12) United States Patent
Koustenis et al.

(10) Patent No.: US 10,134,240 B1
(45) Date of Patent: Nov. 20, 2018

(54) TYPES OF GAMES BASED ON USER-SELECTED GAME PIECES, AND GAME-OPERATING COMPUTER SYSTEMS AND COMPUTER-IMPLEMENTED METHODS THEREOF

(71) Applicant: Intralot S.A.—Integrated Lottery Systems and Services, Athens (GR)

(72) Inventors: Panagiotis Koustenis, Athens (GR); Nikolaos Papadoglou, Athens (GR); Sokratis S. Kokkalis, Athens (GR)

(73) Assignee: Intralot S.A.—Integrated Lottery System and Services, Athens (GR)

( * ) Notice: Subject to any disclaimer, the term of this patent is extended or adjusted under 35 U.S.C. 154(b) by 0 days.

(21) Appl. No.: 15/849,157

(22) Filed: Dec. 20, 2017

Related U.S. Application Data

(60) Provisional application No. 62/596,028, filed on Dec. 7, 2017.

(51) Int. Cl.
*A63F 9/24* (2006.01)
*A63F 13/00* (2014.01)
*G06F 17/00* (2006.01)
*G06F 19/00* (2018.01)
*G07F 17/32* (2006.01)

(52) U.S. Cl.
CPC ........ *G07F 17/329* (2013.01); *G07F 17/3225* (2013.01); *G07F 17/3244* (2013.01)

(58) Field of Classification Search
CPC ........................................................ G07F 17/32
See application file for complete search history.

(56) References Cited

U.S. PATENT DOCUMENTS

2016/0240037 A1 8/2016 Robbins et al.

FOREIGN PATENT DOCUMENTS

WO 2012092672 A1 7/2012
WO 2016185278 A1 11/2016

OTHER PUBLICATIONS

"Black Pearl", Now and Later Lottery Game No. 2702, Hoosier Lottery, State Lottery Commission of Indiana, Sep. 29, 2017, 6 pages.
International Search Report and Written Opinion for PCT Application No. PCT/IB2017/001687 dated Apr. 24, 2018.

*Primary Examiner* — Kevin Y Kim
(74) *Attorney, Agent, or Firm* — Greenberg Traurig, LLP

(57) ABSTRACT

In some embodiments, the present invention provides for a specifically programmed game operating computer system for conducting a personalized game requiring each player to only select a single player-selected game piece to play a personalized instance of the game, where the exemplary system includes following components: a specialized computer machine, including: a non-transient memory, storing program code; and a processor configured to perform: requiring, in real-time, via a graphical interface, each player to select a single player-selected game piece out of a pool of game pieces; receiving, in real time, from each player: a selection of the single player-selected game piece and a player-defined size of a set of drawn game pieces; dynamically self-adjusting, in real time, a personalized self-adjusting payout table; and dynamically conducting at least one drawing where each drawn game piece is selected from a full pool of the pool of game pieces.

17 Claims, 6 Drawing Sheets

| Match | Prize Multipliers | Odds | Payout |
|---|---|---|---|
| 10/10 | 100.000 | 9.765.625,0 | 1,02% |
| 9/10 | 10.000 | 244.140,6 | 4,10% |
| 8/10 | 1.000 | 13.563,4 | 7,37% |
| 7/10 | 100 | 1.271,6 | 7,86% |
| 6/10 | 10 | 181,7 | 5,51% |
| 5/10 | 5 | 37,8 | 13,21% |
| 4/10 | 2 | 11,4 | 17,62% |
| 3/10 | | | |
| 2/10 | | | |
| 1/10 | | | |
| 0/10 | 1 | 9,3 | 10,74% |
| | TOTAL | 4,4 | 67,43% |

| | |
|---|---|
| *Numbers Drawn* | 1-10 |
| *Total Avg Payout* | 67,99% |
| *Overall Winning Frequency* | 20,06% |
| *Overall Odds* | 4,99 |

| *Numbers Drawn* | 10 | 9 | 8 | 7 | 6 | 5 | 4 | 3 | 2 | 1 |
|---|---|---|---|---|---|---|---|---|---|---|
| **Match** | **Prize Multipliers** | | | | | | | | | |
| *10 Numbers* | 100.000 | | | | | | | | | |
| *9 Numbers* | 10.000 | 20.000 | | | | | | | | |
| *8 Numbers* | 1.000 | 2.000 | 5.000 | | | | | | | |
| *7 Numbers* | 100 | 200 | 500 | 2.000 | | | | | | |
| *6 Numbers* | 10 | 25 | 100 | 500 | 1.000 | | | | | |
| *5 Numbers* | 5 | 10 | 20 | 50 | 200 | 400 | | | | |
| *4 Numbers* | 2 | 3 | 4 | 5 | 9 | 30 | 100 | | | |
| *3 Numbers* | | | 1 | 1 | 2 | 3 | 8 | 50 | | |
| *2 Numbers* | | | | | | 1 | 2 | 3 | 9 | |
| *1 Numbers* | | | | | | | | | 1 | 3,5 |
| *0 Numbers* | 1 | 1 | | | | | | | | |
| *Overall Odds* | *4,38* | *4,55* | *4,92* | *6,76* | *10,11* | *3,81* | *5,53* | *9,62* | *2,78* | *5,00* |
| *Payout* | *67,43%* | *67,24%* | *68,23%* | *67,79%* | *67,33%* | *67,84%* | *67,20%* | *68,80%* | *68,00%* | *70,00%* |

*FIG. 7*

| | |
|---|---|
| *Numbers Drawn* | 1-8 |
| *Toal Payout* | 69,24% |
| *Overall Winning Frequency* | 19,17% |
| *Overall Odds* | 5,22 |

| *Numbers Drawn* | 8 | 7 | 6 | 5 | 4 | 3 | 2 | 1 |
|---|---|---|---|---|---|---|---|---|
| **Match** | **Prize Multipliers** | | | | | | | |
| *8 Numbers* | 500.000 | | | | | | | |
| *7 Numbers* | 10.000 | 100.000 | | | | | | |
| *6 Numbers* | 1.000 | 2.000 | 5.000 | | | | | |
| *5 Numbers* | 100 | 250 | 500 | 1.000 | | | | |
| *4 Numbers* | 10 | 25 | 40 | 120 | 250 | | | |
| *3 Numbers* | 2,5 | 4 | 8 | 15 | 40 | 40 | | |
| *2 Numbers* | 1 | 1 | 2 | 3 | 5 | 8 | 16 | |
| *1 Numbers* | | | | | | 1 | 2 | 5,5 |
| *0 Numbers* | | | | | | | | |
| *Overall Odds* | *3,79* | *4,66* | *6,01* | *8,28* | *12,68* | *3,03* | *4,27* | *8,00* |
| *Payout* | *69,62%* | *68,88%* | *69,55%* | *69,70%* | *69,34%* | *69,34%* | *68,75%* | *68,75%* |

*FIG. 8*

TYPES OF GAMES BASED ON USER-SELECTED GAME PIECES, AND GAME-OPERATING COMPUTER SYSTEMS AND COMPUTER-IMPLEMENTED METHODS THEREOF

RELATED APPLICATIONS

This application claims the priority of U.S. Provisional Appln. No. 62/596,028, entitled "NEW TYPES OF DRAWING GAMES WITH REAL-TIME ADJUSTABLE PAYOUTS BASED ON USER-SELECTED DRAWING SIZE AND THEIR APPLICATIONS UTILIZING GAME-OPERATING COMPUTER SYSTEMS AND COMPUTER-IMPLEMENTED METHODS," filed Dec. 7, 2017, which is incorporated herein by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright, Intralot S.A.—Integrated Lottery Systems and Services, All Rights Reserved.

FIELD OF INVENTION

In some embodiments, the present invention is related to drawing games and their applications utilizing game-operating computer systems and computer-implemented methods.

BACKGROUND OF THE INVENTION

In a typical game, such as a lottery type game, players purchase a participation in a single drawing. A game conducting authority then draws x numbers from the same pool of numbers. Player(s) who has/have ticket(s) with winning numbers (i.e., number(s) that match(s) one or more x numbers) would receive a prized based on pre-determined payout table that is common to all players of the same drawing.

SUMMARY OF THE INVENTION

In some embodiments, the present invention provides for a computer-implemented method for conducting a personalized game requiring each respective player to only select a respective single player-selected game piece to play a respective personalized instance of the game, where the method includes at least the following steps of: requiring, in real-time, by at least one specifically programmed computer processor, via a respective game graphical interface, each respective player to select a respective single player-selected game piece out of a pool of game pieces during the respective personalized instance of the game; receiving, in real time, by the at least one specifically programmed computer processor, from each respective player, via the respective game graphical interface, at least: i) a respective selection of the respective single player-selected game piece out of the pool of game pieces and ii) a respective player-defined size of a respective set of drawn game pieces; dynamically self-adjusting, in real time, by the at least one specifically programmed computer, a respective personalized self-adjusting payout table for the respective personalized instance of the game being played by each respective player, based, at least in part, on the respective player-defined size of the respective set of drawn game pieces; dynamically conducting, by the at least one specifically programmed computer processor, at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining, in real-time, by the at least one specifically programmed computer processor, a number of times that the respective single player-selected game piece of each respective player occurs within the respective set of drawn game pieces; dynamically determining, in real-time, by the at least one specifically programmed computer processor, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing, in real-time, by the at least one specifically programmed computer processor, to distribute at least one respective prize to each respective player when the respective outcome of the respective personalized instance of the game corresponds to at least one winning category in the respective personalized self-adjusting payout table.

In some embodiments, the pool of game pieces is selected from the group consisting of:

i) a pool of numbers,
ii) a pool of symbols,
iii) a pool of colors,
iv) a pool of letters,
v) a pool of senses,
vi) a pool of continents,
vii) a pool of geographic locations,
viii) a pool of historical events,
ix) a pool of political events,
x) a pool of descriptions of taste, and
xi) any combination thereof.

In some embodiments, the exemplary method may further include a step of receiving, in real-time, by the at least one specifically programmed computer processor, from each respective player, via the respective game graphical interface, a selection identifying the pool of game pieces for the respective personalized instance of the game.

In some embodiments, the exemplary method may further include a step of dynamically causing, in real-time, by the at least one specifically programmed computer processor, to display a representation of the respective drawing of the respective personalized instance of the game being played by each respective player to a screen of an electronic device associated with each respective player.

In some embodiments, the electronic device is a portable electronic device of each respective player.

In some embodiments, the representation is selected from the group consisting of: reels, wheels of fortunes, suitcases, uncovered mirrors, and any combination thereof.

In some embodiments, the respective personalized self-adjusting payout table has at least one predetermined prize per each winning category for each respective player-defined size of each respective set of drawn game pieces.

In some embodiments, the respective player-defined size of the respective set of drawn game pieces is the same for each player of a plurality of participating players; and where the dynamically self-adjusting the respective personalized self-adjusting payout table for the respective personalized instance of the game being played by each respective player is further based, at least in part, on at least one of: a number of the plurality of participating players and an amount of funds collected from the plurality of participating players.

In some embodiments, the game is a lottery.

In some embodiments, the selecting each drawn game piece from the full pool of the pool of game pieces is based on utilizing at least one of:

i) a random number generator (RNG), ii) a Monte Carlo method processor based on a probability distribution of a pre-determined events, and iii) a lottery technique.

In some embodiments, the plurality of drawn game pieces equals to the respective set of drawn game pieces.

In some embodiments, the present invention provides for a computer-implemented method for conducting a personalized game requiring each respective player to only select a respective single player-selected game piece to play a respective personalized instance of the game, where the method includes at least the steps of: receiving, by at least one specifically programmed computer processor, from each respective player during the respective personalized instance of the game, at least: i) a respective selection of the respective single player-selected game piece out of a pool of game pieces and ii) a respective player-defined size of a respective set of drawn game pieces; dynamically self-adjusting, by the at least one specifically programmed computer, a respective personalized self-adjusting payout table for the respective personalized instance of the game being played by each respective player, based, at least in part, on the respective player-defined size of the respective set of drawn game pieces; conducting at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining, by the at least one specifically programmed computer processor, a number of times that the respective single player-selected game piece of each respective player occurs within the respective set of drawn game pieces; dynamically determining, by the at least one specifically programmed computer processor, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing, by the at least one specifically programmed computer processor, to distribute at least one respective prize to each respective player when the respective outcome of the respective personalized instance of the game corresponds to at least one winning category in the respective personalized self-adjusting payout table.

In some embodiments, the present invention provides for a specifically programmed game operating computer system for conducting a personalized game requiring each respective player to only select a respective single player-selected game piece to play a respective personalized instance of the game, where the exemplary system includes at least the following components: at least one specialized computer machine, including: a non-transient memory, electronically storing particular computer executable program code; and at least one computer processor which, when executing the particular program code, becomes a specifically programmed computer processor of the specifically programmed game operating computer system that is configured to perform at least the following operations: requiring, in real-time, via a respective game graphical interface, each respective player to select a respective single player-selected game piece out of a pool of game pieces during the respective personalized instance of the game; receiving, in real time, from each respective player, via the respective game graphical interface, at least: i) a respective selection of the respective single player-selected game piece out of the pool of game pieces and ii) a respective player-defined size of a respective set of drawn game pieces; dynamically self-adjusting, in real time, a respective personalized self-adjusting payout table for the respective personalized instance of the game being played by each respective player, based, at least in part, on the respective player-defined size of the respective set of drawn game pieces; dynamically conducting at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining, in real-time, a number of times that the respective single player-selected game piece of each respective player occurs within the respective set of drawn game pieces; dynamically determining, in real-time, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing, in real-time, to distribute at least one respective prize to each respective player when the respective outcome of the respective personalized instance of the game corresponds to at least one winning category in the respective personalized self-adjusting payout table.

In some embodiments, the present invention provides for a specifically programmed game operating computer system for conducting a personalized game requiring each respective player to only select a respective single player-selected game piece to play a respective personalized instance of the game, where the exemplary system includes at least the following components: at least one specialized computer machine, including: a non-transient memory, electronically storing particular computer executable program code; and at least one computer processor which, when executing the particular program code, becomes a specifically programmed computer processor of the specifically programmed game operating computer system that is configured to perform at least the following operations: receiving, from each respective player during the respective personalized instance of the game, at least: i) a respective selection of the respective single player-selected game piece out of a pool of game pieces and ii) a respective player-defined size of a respective set of drawn game pieces; dynamically self-adjusting a respective personalized self-adjusting payout table for the respective personalized instance of the game being played by each respective player, based, at least in part, on the respective player-defined size of the respective set of drawn game pieces; receiving data regarding at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining a number of times that the respective single player-selected game piece of each respective player occurs within the respective set of drawn game pieces; dynamically determining, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing to distribute at least one respective prize to each respective player when the respective outcome of the respective personalized instance of the game corresponds to at least one winning category in the respective personalized self-adjusting payout table.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 5-8 illustrate certain aspects of some embodiments of the present invention.

DETAILED DESCRIPTION OF THE INVENTION

Figure 1:
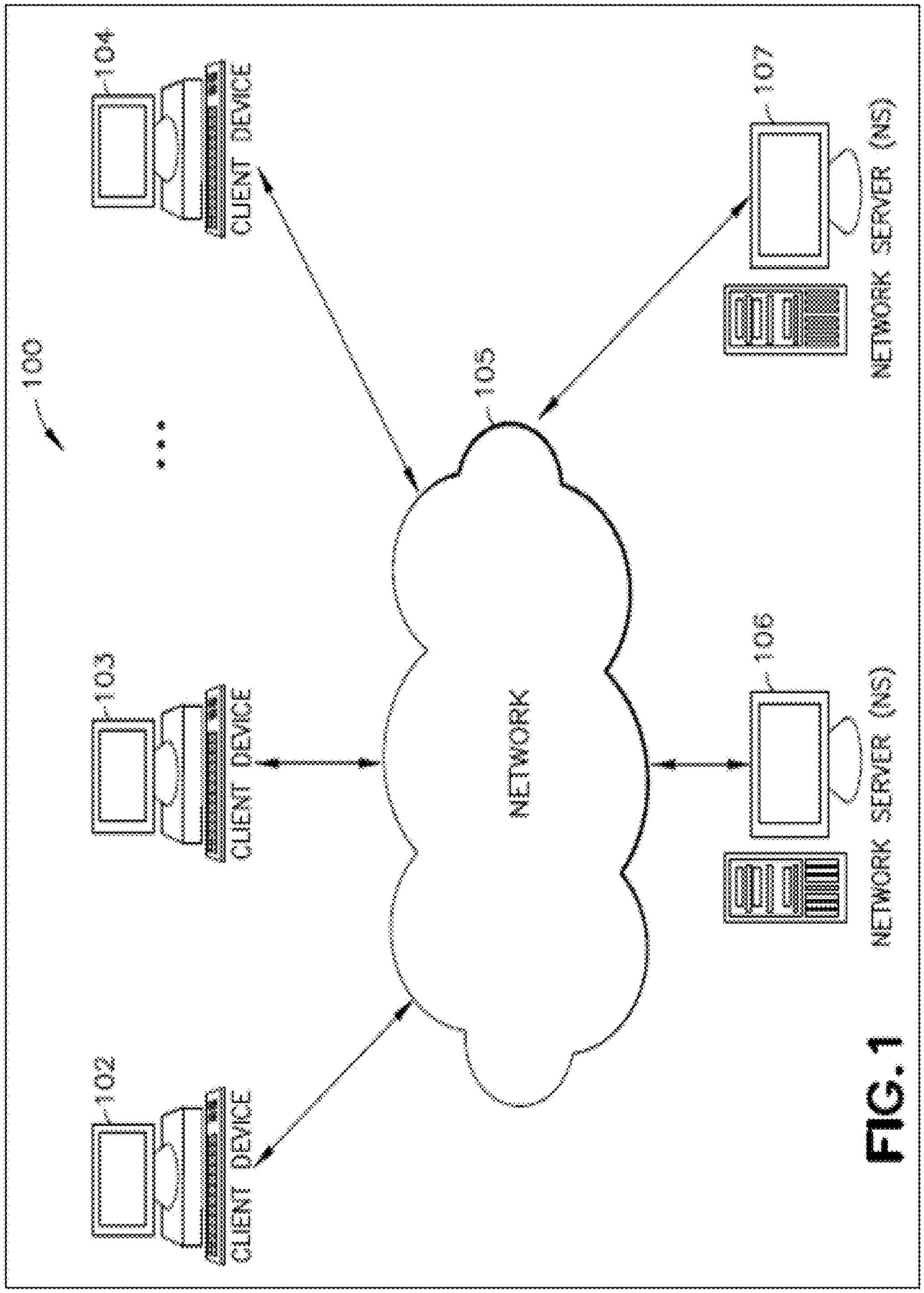
FIGS. 1-4 illustrate certain exemplary computer architecture in accordance with some principles of some embodiments of the present invention.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

The term "based on" is not exclusive and allows for being based on additional factors not described, unless the context clearly dictates otherwise. In addition, throughout the specification, the meaning of "a", "an", and "the" include plural references. The meaning of "in" includes "in" and "on".

Furthermore, the term "player" is equivalent to the term "players" and both terms can be used alternatively without changing the meaning of the sentence, unless the context clearly dictates otherwise; similarly, the terms "winner" and "winners" are interchangeable, unless otherwise indicated.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the game-operating system(s) of the present invention can include the use of electronic mobile devices (e.g., smartphones, etc.) of players and server(s) in the distributed network environment, communicating over a suitable data communication network (e.g., the Internet, etc.) and utilizing at least one suitable data communication protocol (e.g., IPX/SPX, X.25, AX.25, AppleTalk, TCP/IP (e.g., HTTP), etc.).

In some embodiments, an exemplary game-operating system(s) can include the use of an electronic terminal(s), where the electronic terminal(s) can be any purpose terminal that transacts with individuals (e.g., a lottery terminal, a gaming terminal, a vending machine, a cashier register, an individual's mobile device being programmed to serve, as, for example, lottery and/or gaming terminal, etc.).

In some embodiments, players may pay for their participation in the inventive multi-drawing games of the present invention by submitting payments in one of more forms such as, but is not limited to, payments based on Unstructured Supplementary Service Data (USSD) and/or Short Message Service (SMS), direct operator billing, credit card mobile payments, online wallets, QR code payments, contactless near field communication (NFC), cloud-based mobile payments, audio signal-based payment, Bluetooth Low Energy (BLE) signal beacon payment, in-application payment, SDK payment, API payment, social networking payment, direct carrier/bank co-operation, and any combination thereof.

For example, in some embodiments, contactless NFC may be used to receive data for the payment request. For example, a player may participate in a game (e.g., selecting game piece(s)) and/or make a payment utilizing a mobile and wearable device which may be equipped with a smart card. In some embodiments, one or more inventive aspects of the present invention may be combines with one or more embodiments discussed in U.S. Pat. No. 8,678,905 which is hereby incorporated herein in its entirety for such specific purpose. When a user waves the mobile and wearable device near a radar module, a payment is made. In some cases, the payment may require authentication. In some embodiments, the NFC payment could be deducted from a prepaid account or changed to a mobile or band account directly. In some embodiments, NFC payment may include displaying a barcode on the mobile device screen for mobile payment. In some embodiments, the payment barcode can include one or more of the following: a linear barcode, a two-dimensional barcode, a three-dimensional barcode, a machine readable code, and so forth.

In some embodiments, the audio channel of a player's mobile phone may be another wireless interface that may be used to receive data for a transaction request. For example, chip, ultra sound and acoustic features of the mobile and wearable device may support mobile payments. Near sound data transfer (NDST), data over voice and NFC produce audio signatures that the mobile phone can pick up to enable electronic transactions.

In some embodiments, the payment receiving transaction and the payment sending transaction may be performed using a NFC. The NFC may be used to pair the mobile and wearable device and a merchant device by bringing the mobile and wearable device into proximity to the merchant device. The mobile and wearable device and the merchant device may be connected to a cloud network. The financial data and authorizing data associated with the user may be stored in the cloud network. In an example embodiment, upon pairing the mobile and wearable device with the merchant device, a Bluetooth connection between the mobile and wearable device and the merchant device may be established. The payment receiving transaction and the payment sending transaction may include at least a pear-to-pear transaction.

In some embodiments, a beacon mobile payment sends out a Bluetooth Low Energy (BLE) signal to anyone or any device with mobile application to transfer payment data and get electronic receipt. When a player checks in, their picture and name may pop up on the game terminal's point-of-sale system, when a sales associate at the gaming terminal totals a bill on a cash register or a card-reading terminal, the beacon mobile payment player gives verbal confirmation to the associate, who matches the player with the picture on the POS screen and concludes the transaction.

In some embodiments, the player personalizes the visualization of the preferred game winning results. In some embodiments, in the event of a winning result, the system verifies player's eligibility to a prize and approves prize disposal. In some embodiments, the prize may include, but is not limited to, promotional material, cash, virtual currency, physical prizes, loyalty points, recommendations, and any combination thereof.

In some embodiments, the inventive game-operating system(s) are configured to deliver a plurality of drawings to each player of a plurality of players (e.g., but not limited to, at least 1,000 players, at least 10,000 players, at least 100,000 players, etc.) by use of a plurality of graphical user interfaces (GUIs) (e.g., but not limited to, at least 1,000 GUIs at least 10,000 GUIs, at least 100,000 GUIs, etc.).

In some embodiments, an exemplary inventive computer system may be configured to conduct the exemplary new inventive drawing game may include a terminal programmed to conduct the drawings in real-time after the player has paid for playing. In some embodiments, the player's mobile device may execute a client software programmed to conduct drawings al-time after the player has paid for playing. In some embodiments, the player's mobile device or the player-independent terminal may be in communication with a remotely located a server programmed to conduct the plurality of drawings in real-time after the player has paid for playing.

In some embodiments, an exemplary new inventive drawing game with a real-time adjustable payout may be conducted by allowing a player to select only a single game piece (n) from a pool of game pieces, where the pool's size may be from 1 game piece to N game pieces. Then, a drawing is performed by drawing k game pieces where each game piece of k game pieces is drawn each time from the full pool of game pieces that may vary from 1 to N game pieces, and thus, allowing for the same game piece to appear more than once within the set of k game pieces. For example, k number of game pieces may be 10. For example, k number of game pieces may be between 2 and 10. For example, k number of game pieces may be between 2 and 20. For example, k number of game pieces may be between 5 and 10. For example, k number of game pieces may be between 5 and 20. For example, k number of game pieces may be at least 2. For example, k number of game pieces may be at least 3. For example, k number of game pieces may be at least 4. For example, k number of game pieces may be at least 5. For example, k number of game pieces may be at least 6. For example, k number of game pieces may be at least 7. For example, k number of game pieces may be at least 8. For example, k number of game pieces may be at least 9. For example, k number of game pieces may be at least 10. For example, k number of game pieces may be at least 11. For example, k number of game pieces may be at least 12. For example, k number of game pieces may be at least 13. For example, k number of game pieces may be at least 14. For example, k number of game pieces may be at least 15. For example, k number of game pieces may be at maximum 10. For example, k number of game pieces may be at maximum 20.

In some embodiments, each drawing of each game piece from the full pool of game pieces may be done utilizing a random number generator (RNG), Monte Carlo method processor based on a probability distribution of a predetermined events, a traditional lottery technique (e.g., spinning drum with number balls when each ball is placed back into the drum after each number selection and the drum is rotated again to select the next number of k numbers) and/or similarly suitable technique.

In some embodiments, the exemplary inventive computer system may be configured to distribute each prize based only on how many times (sum) the player's selected game piece matches the k drawn game pieces (i.e., m/k, where $0 \leq m \leq k$).

In some embodiments, the exemplary inventive computer system may be configured to distribute each prize based, at least in part, on how many times (sum) the player's selected game piece matches the k drawn game pieces (i.e., m/k, where $0 \leq m \leq k$).

In some embodiments, the exemplary inventive computer system may be configured to conduct the exemplary new inventive drawing game by allowing the player to select how many game pieces (d) are to be drawn from a maximum allowed number. For example, the player may select to have d number of game pieces drawn, even when d is less than k number, where k is the maximum limit of game pieces that may be drawn (i.e., $d \leq k$). For example, the player may select to have take a draw of 7 game pieces instead of 10. In such a case, a payout table is readjusted accordingly in real time.

In some embodiments, a particular pool of game pieces may be represented by a pool of numbers, a pool of symbols, a pool of colors, a pool of letters, a pool of senses, a pool of continents, a pool of geographic locations, a pool of historical events, a pool of political events, a pool of descriptions of taste, and/or any combination thereof. In some embodiments, the exemplary inventive computer system may be configured to allow each player to choose a personalized pool of game pieces.

In some embodiments, each drawing may be common to a group of players defined by one or more criteria such as, but not limited to, being within a geographic locale, being in a particular establishment (e.g., Macy's, shopping mall, casino, etc.), being in a particular time zone, being in a particular virtual environment, etc.).

In some embodiments, the exemplary inventive computer system may be configured to conduct each drawing at a predetermined frequency and/or a particular time (e.g., every 1 hour, every 5 minutes, at 10 A.M. EST, etc.).

In some embodiments, the exemplary inventive computer system may be configured to conduct an instant drawing (personalized) for any player participating in physical (e.g., lottery terminal, casino terminal, etc.) and on-line environment (e.g., virtual client on player's mobile device). In some embodiments, the exemplary inventive computer system may be configured to visually present the drawing process of the present invention in any suitable form such as, but not limited to, in reels, wheels of fortunes, suitcases, uncovered mirrors, etc.

In some embodiments, an exemplary inventive self-adjusting payout table may have predetermined (fixed) payout/prize per each winning category and/or for each d that the player may select. In some embodiments, the exemplary inventive self-adjusting payout table may be configured to self-adjust in real time a payout category/prize and/or wining category based at least in part on d number of game pieces that the player may select and, optionally, at least one of, but not limited to, a number of participating players, amount of funds collected from players, etc. In some embodiments, the exemplary inventive computer system may be configured to establish a pool prize fund (calculated as a turnover percentage) which would be collected in order to create a progressive jackpot for a winner of the top winning category (d/d, for each d that player may select (where $d \leq k$)).

Illustrative example when the particular pool of game pieces corresponds to a pool of numbers In some embodiments, an exemplary new inventive drawing game with a real-time adjustable payout may be conducted by allowing a player to select a first number (n) from a range of 1 up to N (e.g., n=1 out of the range of 1 to 5). Then, a drawing is performed by drawing k numbers where each number of k numbers is drawn from a range of 1 to N.

For example, k may be 10. For example, k may be between 2 and 10. For example, k may be between 2 and 20. For example, k may be between 5 and 10. For example, k may be between 5 and 20. For example, k may be at least 2. For example, k may be at least 3. For example, k may be at least 4. For example, k may be at least 5. For example, k may be at least 6. For example, k may be at least 7. For example, k may be at least 8. For example, k may be at least 9. For example, k may be at least 10. For example, k may be at least 11. For example, k may be at least 12. For example, k may be at least 13. For example, k may be at least 14. For example, k may be at least 15. For example, k number of game pieces may be at maximum 10. For example, k number of game pieces may be at maximum 20.

In some embodiments, the exemplary inventive computer system may be configured to distribute a prize based on how many (m) numbers the player matches among the k drawn numbers (i.e., m/k, where $0 \leq m \leq k$).

In some embodiments, the exemplary inventive computer system may be configured to conduct the exemplary new inventive multi-drawing game by allowing the player to select how many (d) numbers are to be drawn from a maximum allowed number. For example, the player may select to have d numbers drawn, even when d is less than k number, where k is the maximum limit of numbers that may be drawn (i.e., $d \leq k$). For example, the player may select to have take a draw of 7 numbers instead of 10.

Figures 5, 6:
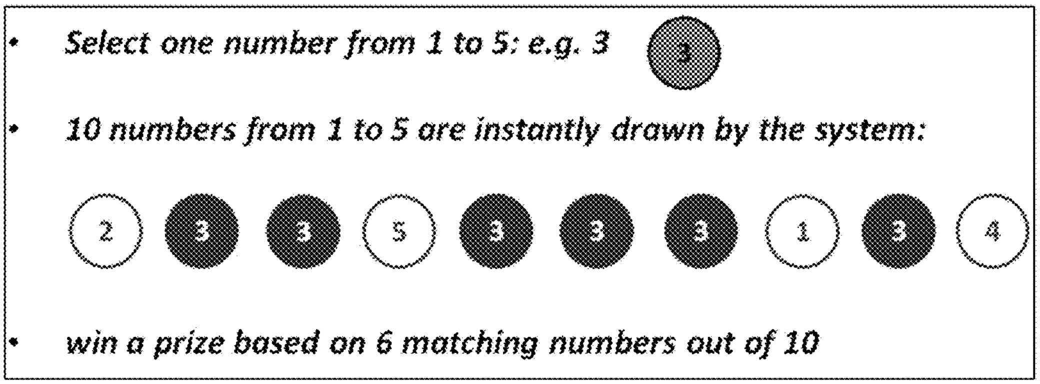

FIG. 5 illustrates an example of the playing an exemplary embodiment of the inventive drawing based on the pool of numbers.

Illustrative Examples of the Exemplary Inventive Self-Adjusting Payout Table

FIG. 6 illustrates an example of the inventive self-adjusting payout table for the pool of numbers (1 to N=5) with k and d equal to 10. For example, the top wining category would have odds of 1 in 9,765,625 with a top prize being equal to 100,000 times the stake. Further, the overall odds would be 1 in 4.4 or 22.8% and the overall payout of 67.43%. In some embodiments, the top prize payout of the payout table of FIG. 6 may be increased by a predetermined amount (e.g., 20.5% instead of 1.02%), resulting in a progressive jackpot which may theoretically reach the multiplier of 2 million and, then, the prize multiplier of 100,000 may be the minimum guarantee jackpot amount.

FIG. 7 illustrates an example of the inventive self-adjusting payout table for the pool of numbers (1 to N=5) with k equals 10, and d equal or less than k. In such a case, in the example of the inventive self-adjusting payout table of FIG. 7, the exemplary inventive computer system may be configured to re-adjust in real time odds and/or prizes accordingly to the player's selection of d.

FIG. 8 illustrates an example of the inventive self-adjusting payout table for the pool of numbers (1 to N=8) with k equals 8, and d equal or less than k. In such a case, in the example of the inventive self-adjusting payout table of FIG. 8, the exemplary inventive computer system may be configured to re-adjust in real time odds and/or prizes accordingly to the player's selection of d as well.

Illustrative Operating Environments

FIG. 1 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates varies strategies for assessing the data, caching, searching, and database connection pooling. An example of the scalable architecture is an architecture that is capable of operating multiple servers.

In some embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In some embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In some embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In some embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
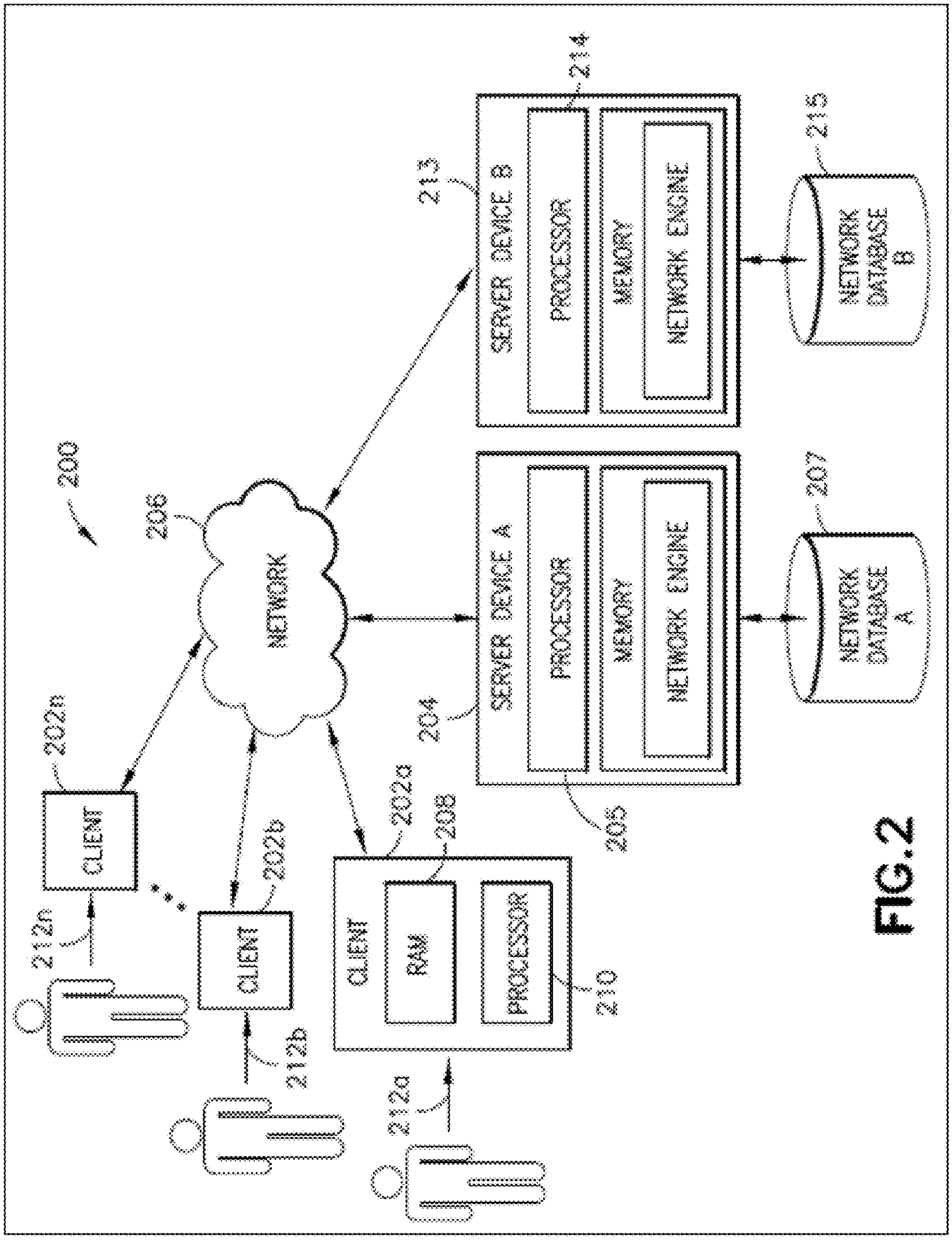

FIG. 2 shows another exemplary embodiment of the computer and network architecture that supports the methods and systems of the instant invention. In some embodiments, the member devices 202*a*, 202*b* thru 202*n* shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors comprise a microprocessor, an ASIC, and state machines. In some embodiments, uch processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202*a-n* may also comprise a number of external or internal devices such as a mouse, a CD-ROM, DVD, a keyboard, a display, or other input or output devices. Examples of client devices 202*a-n* may be personal computers, digital assistants, personal digital assistants, cellular phones, mobile phones, smart phones, pagers, digital tablets, laptop computers, Internet appliances, and other processor-based devices. In general, a client device 202*a* may be any type of processor-based platform that is connected to a network 206 and that interacts with one or more application programs. Client devices 202*a-n* may operate on any operating system capable of supporting a browser or browser-enabled application, such as Microsoft™, Windows™, or Linux. The client devices 202*a-n* shown may include, for example, personal computers executing a browser application program such as Microsoft Corporation's Internet Explorer™, Apple Computer, Inc.'s Safari™, Mozilla Firefox, and Opera. Through the client devices 202*a-n*, users, 212*a-n* communicate over the network 206 with each other and with other systems and devices coupled to the network 206. As shown in FIG. 2, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiments, NFC may operate at 13.56 MHz on ISO/IEC 18000-3 air interface and at rates ranging fromterminal106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 3:
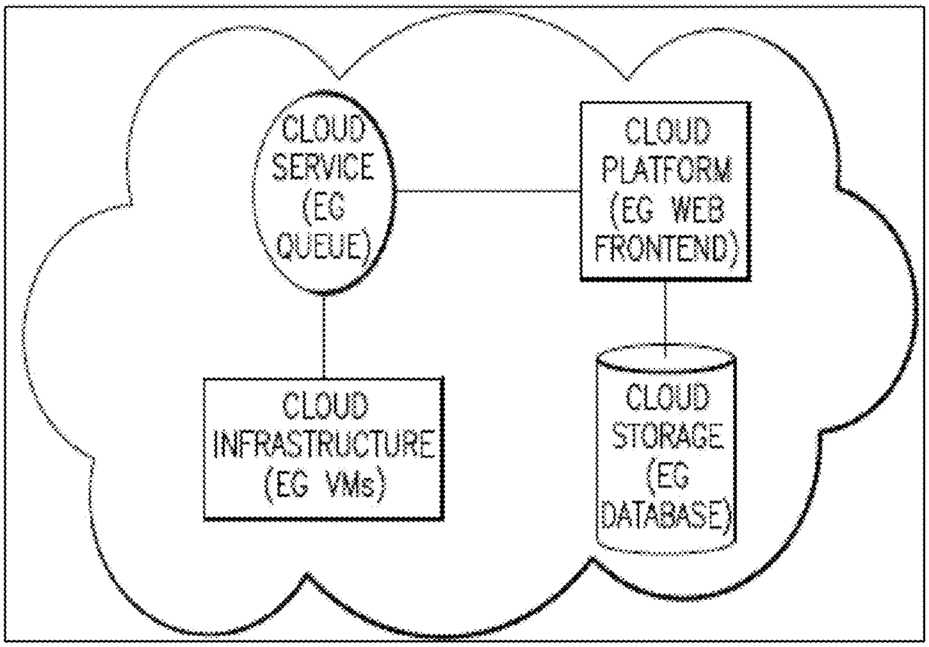
Figure 4:
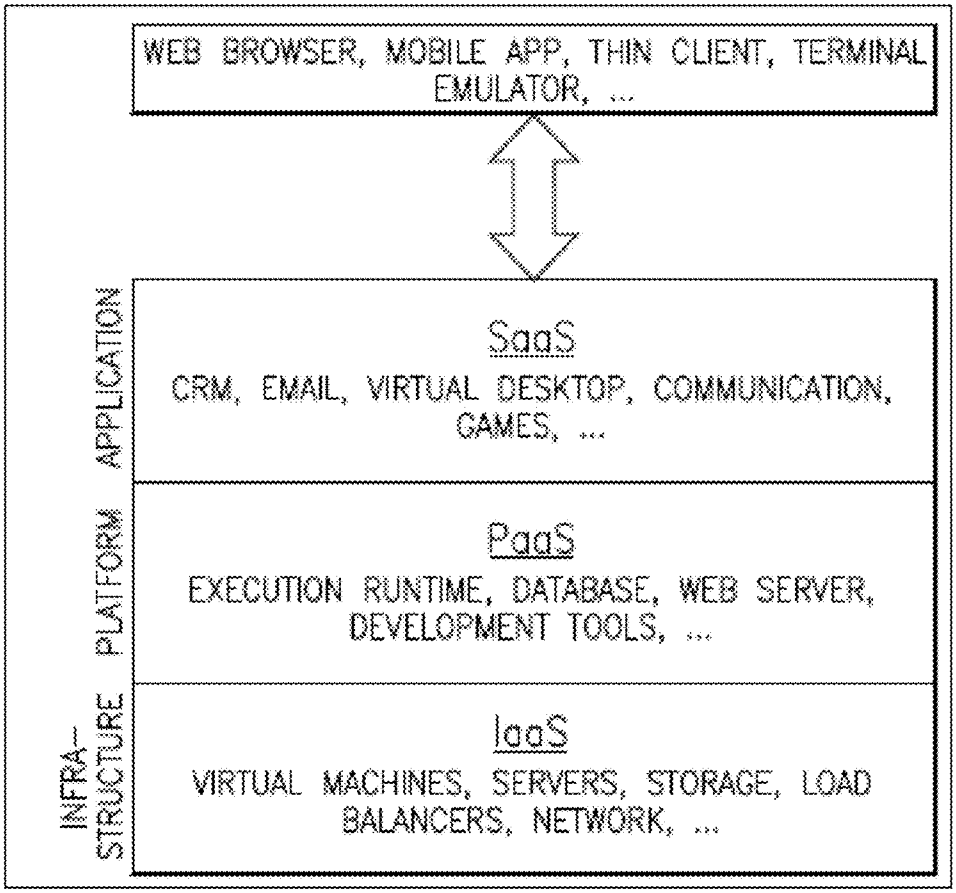

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the inventive game-operating system offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

In some embodiments, the present invention provides for a computer-implemented method for conducting a personalized game requiring each respective player to only select a respective single player-selected game piece to play a respective personalized instance of the game, where the method includes at least the following steps of: requiring, in real-time, by at least one specifically programmed computer processor, via a respective game graphical interface, each respective player to select a respective single player-selected game piece out of a pool of game pieces during the respective personalized instance of the game; receiving, in real time, by the at least one specifically programmed computer processor, from each respective player, via the respective game graphical interface, at least: i) a respective selection of the respective single player-selected game piece out of the pool of game pieces and ii) a respective player-defined size of a respective set of drawn game pieces; dynamically self-adjusting, in real time, by the at least one specifically programmed computer, a respective personalized self-adjusting payout table for the respective personalized instance of the game being played by each respective player, based, at least in part, on the respective player-defined size of the respective set of drawn game pieces; dynamically conducting, by the at least one specifically programmed computer processor, at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining, in real-time, by the at least one specifically programmed computer processor, a number of times that the respective single player-selected game piece of each respective player occurs within the respective set of drawn game pieces; dynamically determining, in real-time, by the at least one specifically programmed computer processor, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing, in real-time, by the at least one specifically programmed computer processor, to distribute at least one respective prize to each respective player when the respective outcome of the respective personalized instance of the game corresponds to at least one winning category in the respective personalized self-adjusting payout table.

In some embodiments, the pool of game pieces is selected from the group consisting of:

i) a pool of numbers,
ii) a pool of symbols,
iii) a pool of colors,
iv) a pool of letters,
v) a pool of senses,
vi) a pool of continents,
vii) a pool of geographic locations,
viii) a pool of historical events,
ix) a pool of political events,
x) a pool of descriptions of taste, and
xi) any combination thereof.

In some embodiments, the exemplary method may further include a step of receiving, in real-time, by the at least one specifically programmed computer processor, from each respective player, via the respective game graphical interface, a selection identifying the pool of game pieces for the respective personalized instance of the game.

In some embodiments, the exemplary method may further include a step of dynamically causing, in real-time, by the at least one specifically programmed computer processor, to display a representation of the respective drawing of the respective personalized instance of the game being played by each respective player to a screen of an electronic device associated with each respective player.

In some embodiments, the electronic device is a portable electronic device of each respective player.

In some embodiments, the representation is selected from the group consisting of: reels, wheels of fortunes, suitcases, uncovered mirrors, and any combination thereof.

In some embodiments, the respective personalized self-adjusting payout table has at least one predetermined prize per each winning category for each respective player-defined size of each respective set of drawn game pieces.

In some embodiments, the respective player-defined size of the respective set of drawn game pieces is the same for each player of a plurality of participating players; and where the dynamically self-adjusting the respective personalized self-adjusting payout table for the respective personalized instance of the game being played by each respective player is further based, at least in part, on at least one of: a number of the plurality of participating players and an amount of funds collected from the plurality of participating players.

In some embodiments, the game is a lottery.

In some embodiments, the selecting each drawn game piece from the full pool of the pool of game pieces is based on utilizing at least one of:

i) a random number generator (RNG), ii) a Monte Carlo method processor based on a probability distribution of a pre-determined events, and iii) a lottery technique.

In some embodiments, the plurality of drawn game pieces equals to the respective set of drawn game pieces.

In some embodiments, the present invention provides for a computer-implemented method for conducting a personalized game requiring each respective player to only select a respective single player-selected game piece to play a respective personalized instance of the game, where the method includes at least the steps of: receiving, by at least one specifically programmed computer processor, from each respective player during the respective personalized instance of the game, at least: i) a respective selection of the respective single player-selected game piece out of a pool of game pieces and ii) a respective player-defined size of a respective set of drawn game pieces; dynamically self-adjusting, by the at least one specifically programmed computer, a respective personalized self-adjusting payout table for the respective personalized instance of the game being played by each respective player, based, at least in part, on the respective player-defined size of the respective set of drawn game pieces; conducting at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining, by the at least one specifically programmed computer processor, a number of times that the respective single player-selected game piece of each respective player occurs within the respective set of drawn game pieces; dynamically determining, by the at least one specifically programmed computer processor, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing, by the at least one specifically programmed computer processor, to distribute at least one respective prize to each respective player when the respective outcome of the respective personalized instance of the game corresponds to at least one winning category in the respective personalized self-adjusting payout table.

In some embodiments, the present invention provides for a specifically programmed game operating computer system for conducting a personalized game requiring each respective player to only select a respective single player-selected game piece to play a respective personalized instance of the game, where the exemplary system includes at least the following components: at least one specialized computer machine, including: a non-transient memory, electronically storing particular computer executable program code; and at least one computer processor which, when executing the particular program code, becomes a specifically programmed computer processor of the specifically programmed game operating computer system that is configured to perform at least the following operations: requiring, in real-time, via a respective game graphical interface, each respective player to select a respective single player-selected game piece out of a pool of game pieces during the respective personalized instance of the game; receiving, in real time, from each respective player, via the respective game graphical interface, at least: i) a respective selection of the respective single player-selected game piece out of the pool of game pieces and ii) a respective player-defined size of a respective set of drawn game pieces; dynamically self-adjusting, in real time, a respective personalized self-adjusting payout table for the respective personalized instance of the game being played by each respective player, based, at least in part, on the respective player-defined size of the respective set of drawn game pieces; dynamically conducting at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining, in real-time, a number of times that the respective single player-selected game piece of each respective player occurs within the respective set of drawn game pieces; dynamically determining, in real-time, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing, in real-time, to distribute at least one respective prize to each respective player when the respective outcome of the respective personalized instance of the game corresponds to at least one winning category in the respective personalized self-adjusting payout table.

In some embodiments, the present invention provides for a specifically programmed game operating computer system for conducting a personalized game requiring each respective player to only select a respective single player-selected game piece to play a respective personalized instance of the game, where the exemplary system includes at least the following components: at least one specialized computer machine, including: a non-transient memory, electronically storing particular computer executable program code; and at least one computer processor which, when executing the particular program code, becomes a specifically programmed computer processor of the specifically programmed game operating computer system that is configured to perform at least the following operations: receiving, from each respective player during the respective personalized instance of the game, at least: i) a respective selection of the respective single player-selected game piece out of a pool of game pieces and ii) a respective player-defined size of a respective set of drawn game pieces; dynamically self-adjusting a respective personalized self-adjusting payout table for the respective personalized instance of the game being played by each respective player, based, at least in part, on the respective player-defined size of the respective set of drawn game pieces; receiving data regarding at least one respective drawing of the respective personalized instance of the game being played by each respective player; where the at least one respective drawing yields a plurality of drawn game pieces that includes the respective set of drawn game pieces having the respective player-defined size; where each drawn game piece of the plurality of drawn game is selected from a full pool of the pool of game pieces; dynamically determining a number of times that the respective single player-selected game piece of each respective player occurs within the respective set of drawn game pieces; dynamically determining, for each respective player, a respective outcome of the respective personalized instance of the game based on: i) the number of times that the respective single player-selected game piece of each respective player occurs within the respective set of drawn game pieces and ii) the respective personalized self-adjusting payout table for the respective personalized instance of the game; and dynamically causing to distribute at least one respective prize to each respective player when the respective outcome of the respective personalized instance of the game corresponds to at least one winning category in the respective personalized self-adjusting payout table.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method for conducting a personalized game requiring each respective player to only select a respective single player-selected game piece to play a respective personalized instance of the game, wherein the method, comprising:

causing, during first personalized instance of the game, by at least one specifically programmed computer processor, to display an entire pool of game pieces to a first player via a first game graphical interface;

receiving, during the first personalized instance of the game, by the at least one specifically programmed computer processor, from the first player, via first game graphical interface, at least a first selection of:

i) a first player-selected game piece out of the entire pool of game pieces, wherein the first player is allowed to selected only one game piece during the first personalized instance of the game, and ii) a first to-be-selected number identifying how many game pieces should be selected during the first personalized instance of the game being played by the first player;

dynamically defining, by the at least one specifically programmed computer, a plurality of first winning categories based, at least in part, on the first to-be-selected number;

dynamically selecting, by the at least one specifically programmed computer processor, a plurality of first-selected game pieces, wherein a number of the first-selected game pieces in the plurality of first-selected game pieces equals to the first to-be-selected number;

wherein each respective first-selected game piece of the plurality of first-selected game pieces is selected from the entire pool of game pieces;

dynamically determining, by the at least one specifically programmed computer processor, a first occurrence number that represents how many times the first player-selected game piece occurs within the first plurality of first-selected game pieces;

dynamically determining, by the at least one specifically programmed computer processor, for the first player, a first winning category from the plurality of first winning categories based, at least in part, on the first occurrence number dynamically causing, by the at least one specifically programmed computer processor, to distribute at least one first prize to the first player based, at least in part, on the first winning category of the plurality of first winning categories;

causing, during a second personalized instance of the game, by the at least one specifically programmed computer processor, to display the entire pool of game pieces to a second player via a second game graphical interface;

receiving, during the second personalized instance of the game, by the at least one specifically programmed computer processor, from the second player, via the second game graphical interface, at least a second selection of:

i) a second player-selected game piece out of the entire pool of game pieces, wherein the second player is allowed to selected only one game piece during the second personalized instance of the game, and ii) a second to-be-selected number identifying how many game pieces should be selected during the second personalized instance of the game being played by the second player;

dynamically defining, by the at least one specifically programmed computer, a plurality of second winning categories based, at least in part, on the second to-be-selected number;

dynamically selecting, by the at least one specifically programmed computer processor, a plurality of second-selected game pieces, wherein a number of the second-selected game pieces in the plurality of second-selected game pieces equals to the second to-be-selected number;

wherein each respective second-selected game piece of the plurality of second-selected game pieces is selected from the entire pool of game pieces;

dynamically determining, by the at least one specifically programmed computer processor, a second occurrence number that represents how many times the second player-selected game piece occurs within the plurality of second-selected game pieces;

dynamically determining, by the at least one specifically programmed computer processor, for the second player, a second winning category from the plurality of second winning categories based, at least in part, on the second occurrence number;

dynamically causing, by the at least one specifically programmed computer processor, to distribute at least one second prize to the second player based, at least in part, on the second winning category of the plurality of second winning categories; and wherein the game is configured so as to permit:

1) the first to-be-drawn number to be distinct from the second to-be-drawn number and 2) the plurality of first winning categories to be distinct from the plurality of second winning categories.

2. The method for conducting the personalized game of claim 1, wherein the entire pool of game pieces is selected from the group consisting of:

i) a pool of numbers, ii) a pool of symbols, iii) a pool of colors, iv) a pool of letters, v) a pool of senses, vi) a pool of continents, vii) a pool of geographic locations, viii) a pool of historical events, ix) a pool of political events, x) a pool of descriptions of taste, and xi) any combination thereof.

3. The method for conducting the personalized game of claim 2, wherein the method further comprises:

receiving, by the at least one specifically programmed computer processor, from each respective player, via the respective game graphical interface, a selection identifying the entire pool of game pieces for the respective personalized instance of the game.

4. The method for conducting the personalized game of claim 1, wherein the method further comprises:

dynamically causing, by the at least one specifically programmed computer processor, to display a representation of the respective personalized instance of the game being played by each respective player to a screen of an electronic device associated with each respective player.

5. The method for conducting the personalized game of claim 4, wherein the electronic device is a portable electronic device of each respective player.

6. The method for conducting the personalized game of claim 4, wherein the representation is selected from the group consisting of: reels, wheels of fortunes, suitcases, uncovered mirrors, and any combination thereof.

7. The method for conducting the personalized game of claim 1, wherein the game is a lottery.

8. The method for conducting the personalized game of claim 1, wherein the selecting each respective game piece from the entire pool of game pieces is based on utilizing at least one of:

i) a random number generator (RNG), and ii) a Monte Carlo method processor based on a probability distribution of a pre-determined events.

9. A specifically programmed game operating computer system for conducting a personalized game requiring each respective player to only select a respective single player-selected game piece to play a respective personalized instance of the game, comprising:

at least one specialized computer machine, comprising:

a non-transient memory, electronically storing particular computer executable program code; and at least one computer processor which, when executing the particular program code, becomes a specifically programmed computer processor of the specifically programmed game operating computer system that is configured to perform at least the following operations:

causing, during first personalized instance of the game to display an entire pool of game pieces to a first player via a first game graphical interface;

receiving, during the first personalized instance of the game, from the first player, via the first game graphical interface, at least a first selection of:

i) a first player-selected game piece out of the entire pool of game pieces, wherein the first player is allowed to selected only one game piece during the first personalized instance of the game, and ii) a first to-be-selected number identifying how many game pieces should be selected during the first personalized instance of the game being played by the first player;

dynamically defining a plurality of first winning categories based, at least in part, on the first to-be-selected number;

dynamically selecting a plurality of first-selected game pieces, wherein a number of the first-selected game pieces in the plurality of first-selected game pieces equals to the first to-be-selected number;

wherein each first-selected game piece of the plurality of first-selected game pieces is selected from entire pool of game pieces;

dynamically determining a first occurrence number that represents how many times the first player-selected game piece occurs within the first plurality of first-selected game pieces;

dynamically determining for the first player, a first winning category from the plurality of first winning categories based, at least in part, on the first occurrence number dynamically causing to distribute first prize to the first player based, at least in part, on the first winning category of the plurality of first winning categories;

causing, during a second personalized instance of the game, by the at least one specifically programmed computer processor, to display the entire pool of game pieces to a second player via a second game graphical interface;

receiving, during a second personalized instance of the game, from the second player, via the second game graphical interface, at least a second selection of:

i) a second player-selected game piece out of the entire pool of game pieces, wherein the second player is allowed to selected only one game piece during the second personalized instance of the game, and ii) a second to-be-selected number identifying how many game pieces should be selected during the second personalized instance of the game being played by the second player;

dynamically defining a plurality of second winning categories based, at least in part, on the second to-be-selected number;

dynamically selecting a plurality of second-selected game pieces, wherein a number of the second-selected game pieces in the plurality of second-selected game pieces equals to the second to-be-selected number;

wherein each respective second-selected game piece of the plurality of second-selected game pieces is selected from the entire pool of game pieces;

dynamically determining a second occurrence number that represents how many times the second player-selected game piece occurs within the plurality of second-selected game pieces;

dynamically determining, for the second player, a second winning category from the plurality of second winning categories based, at least in part, on the second occurrence number;

dynamically causing to distribute at least one second prize to the second player based, at least in part, on the second winning category of the plurality of second winning categories; and wherein the game is configured so as to permit:

1) the first to-be-drawn number to be distinct from the second to-be-drawn number and 2) the plurality of first winning categories to be distinct from the plurality of second winning categories.

10. The system of claim 9, wherein the entire pool of game pieces is selected from the group consisting of:

i) a pool of numbers, ii) a pool of symbols, iii) a pool of colors, iv) a pool of letters, v) a pool of senses, vi) a pool of continents, vii) a pool of geographic locations, viii) a pool of historical events, ix) a pool of political events, x) a pool of descriptions of taste, and xi) any combination thereof.

11. The system of claim 9, wherein the specifically programmed computer processor of the specifically programmed game operating computer system is configured to further perform at least the following:

dynamically causing to display a representation of the respective personalized instance of the game being played by each respective player to a screen of an electronic device associated with each respective player.

12. The system of claim 11, wherein the electronic device is a portable electronic device of each respective player.

13. The system of claim 11, wherein the representation is selected from the group consisting of: reels, wheels of fortunes, suitcases, uncovered mirrors, and any combination thereof.

14. The system of claim 9, wherein the specifically programmed computer processor of the specifically programmed game operating computer system is configured to further perform at least the following:

selecting each respective game piece from the entire pool of game pieces based on utilizing at least one of:

i) a random number generator (RNG), and ii) a Monte Carlo method processor based on a probability distribution of a pre-determined events.

15. The system of claim 9, wherein the game is a lottery.

16. The system of claim 10, wherein the specifically programmed computer processor of the specifically programmed game operating computer system is configured to further perform at least the following:

receiving, from each respective player, via the respective game graphical interface, a selection identifying the entire pool of game pieces for the respective personalized instance of the game.

17. The system of claim 11, wherein the representation is selected from the group consisting of: reels, wheels of fortunes, suitcases, uncovered mirrors, and any combination thereof.

* * * * *